United States Patent [19]
Laitar

[11] 4,436,881
[45] Mar. 13, 1984

[54] POLYURETHANE BINDER COMPOSITIONS

[75] Inventor: Robert A. Laitar, Woodridge, Ill.

[73] Assignee: Acme Resin Corporation, Forest Park, Ill.

[21] Appl. No.: 508,781

[22] Filed: Jun. 29, 1983

[51] Int. Cl.³ .................. C08G 18/06; C08G 18/08; C08G 18/28
[52] U.S. Cl. .................. 525/504; 164/525; 164/526; 164/527; 524/115; 524/142; 528/51
[58] Field of Search .......... 525/504; 528/51; 524/115, 142

[56] References Cited

U.S. PATENT DOCUMENTS

| | | |
|---|---|---|
| 3,245,924 | 4/1966 | Cox et al. .................. 525/504 X |
| 3,332,893 | 7/1967 | Birum et al. .................. 528/51 X |
| 3,409,579 | 11/1968 | Robins . |
| 3,450,669 | 6/1969 | Nolen . |
| 3,497,465 | 2/1970 | Kujawa et al. .................. 528/51 X |
| 3,900,686 | 8/1975 | Ammons et al. .................. 528/51 X |
| 3,905,934 | 9/1975 | Gardikes . |
| 3,965,073 | 6/1976 | Olstowski et al. .................. 528/51 X |
| 4,085,072 | 4/1978 | Russo . |
| 4,235,976 | 11/1980 | Haas et al. .................. 528/51 X |
| 4,246,157 | 1/1981 | Laitar . |
| 4,268,425 | 5/1981 | Gardikes . |
| 4,361,692 | 11/1982 | Ammons .................. 528/51 |

*Primary Examiner*—Howard E. Schain
*Attorney, Agent, or Firm*—Stanley M. Parmerter

[57] ABSTRACT

An improved polyurethane binder system is provided which incorporates organic phosphorous compounds that impart longer bench life to the binders making them more useful for preparing moldable compositions such as foundry cores and molds.

33 Claims, No Drawings

POLYURETHANE BINDER COMPOSITIONS

FIELD OF THE INVENTION

This invention relates to binder compositions, moldable compositions which include the binders and aggregate material, cores or molds made from the moldable compositions and a process for making them. More particularly, the invention relates to foundry binder compositions, moldable compositions including the same and aggregate material and foundry cores or molds made therefrom, including a process for their manufacture.

BACKGROUND OF THE INVENTION

Binders or binder systems for foundry cores and molds are well known. In the foundry art, cores or molds for making metal castings are normally prepared from a mixture of an aggregate material, such as sand, and a binding amount of a binder or binder system. Typically, after the aggregate material and binder have been mixed, the resultant mixture is rammed, blown or otherwise formed to the desired shape or patterns and then cured with the use of catalysts and/or heat to a solid, cured state.

While many different processes for forming molds or cores have been developed in the foundry industry, a fairly recent development called the "cold box" process has generated substantial interest. "Cold box" processes are carried out by passing gaseous catalysts through molded resin-coated sand at ambient temperatures in order to achieve curing. In such systems, the resinous material is generally dissolved in a solvent before it is coated on the aggregate material. "Cold box" binders and processes are disclosed in U.S. Pat. Nos. 3,905,934, 3,409,579 and 4,246,157.

The types of binders commonly used in the "cold box" system are disclosed in the aforementioned U.S patents. They are normally polyurethanes formed from polyhydroxy compounds and polyisocyanates. The polyhydroxy compounds in turn are commonly prepared from phenols and formaldehyde. While such systems have met with commercial acceptance, there is still need for a "cold box" system which exhibits improved bench life. The bench life, or time after the sand mixture is prepared that it can be used satisfactorily, is much shorter with "cold box" systems than with mixes used in other foundry processes. "Cold box" sand mixes typically begin to show substantial loss of properties 2 to 3 hours after mixing, and often the actual working life is much shorter than this, particularly in warm, humid environments.

In a typical "cold box" application, the sand is mixed with the polyhydroxy compound and the polyisocyanate in a mixer such as a muller. The sand is transported to the core blower where it is stored, usually in a hopper, and fed to the blow head as needed. The sand mixture is blown, using air pressure, into a core box and cured by passing a gaseous tertiary amine catalyst through the mix to form a cured polyurethane polymer, which bonds the sand into the desired shape. The polyhydroxy compound and polyisocyanate can react, however, even in the absence of catalysts. This slow, uncatalyzed reaction, while the sand is in the hopper and blow head, results in reduced flowability and lower tensile strength development when the cores are cured in the core box. This can lead to the production of weak, poorly compacted cores, which are prone to breakage during handling and storage. Poorly compacted cores can produce castings with unacceptable finish or with such defects as penetration or erosion. Sand in a core machine which can no longer be used must be cleaned from hoppers and the blow head, causing sand waste and machine down time. Further, cleanup at the end of a work day is much easier if the sand remaining in the blow head and hopper remains soft and does not adhere to the equipment.

Now it has been found, in accordance with this invention, that the addition of certain phosphorous compounds to the binders retards the uncatalyzed reaction between the polyhydroxy compound and polyisocyanate providing improved "cold box" binder systems with longer bench life.

SUMMARY OF THE INVENTION

In accordance with this invention, there is provided a binder composition comprising a polyhydroxy component, an isocyanate component having a functionality of two or more and sufficient catalyst to catalyze substantially completely the reaction between the polyhydroxy component and the isocyanate component, wherein the improvement comprises including in the composition an additive selected from the group consisting of dichloroarylphosphines, chlorodiarylphosphines, arylphosphonic dichlorides, diarylphosphinyl chlorides, and mixtures thereof, said additive being present in an amount equal to from about 0.02% to about 3% by weight of the isocyanate component.

Additionally, in accordance with the invention, there is provided a moldable composition comprising aggregate material, such as foundry sand, and a binder composition comprising a polyhydroxy component, an isocyanate component having a functionality of two or more and sufficient catalyst to catalyze substantially completely the reaction between the polyhydroxy component and the isocyanate component, wherein the improvement comprises including in the composition an additive selected from the group consisting of dichloroarylphosphines, chlorodiarylphosphines, arylphosphonic dichlorides, diarylphosphinyl chlorides, and mixtures thereof, said additive being present in an amount equal to from about 0.02% to about 3% by weight of the isocyanate component.

Finally, in accordance with the invention, there is provided a process for making foundry cores or molds which comprises admixing aggregate material, such as foundry sand or the like, and a binding amount of a binder composition comprising a polyhydroxy component, an isocyanate component having a functionality of two or more, and an additive selected from the group consisting of dichloroarylphosphines, chlorodiarylphosphines, arylphosphonic dichlorides, diarylphosphinyl chlorides, and mixtures thereof. The additive is present in an amount equal to from about 0.02% to about 3% by weight of the isocyanate component. The mixture of aggregate material and binder composition is shaped as a core or mold, and the components are treated with sufficient catalyst to bring about substantially complete reaction between these components to give a cured core or mold.

DESCRIPTION OF PREFERRED EMBODIMENTS

The polyhydroxy component employed in the practice of this invention, can vary widely. It may be any organic hydroxy compound, having a functionality of two or more that is soluble in the solvents employed. Such polyhydroxy compounds can include simple aliphatic polyols, polyether polyols, phenolic resins and mixtures of these.

A suitable polyhydroxy component is a phenolic resin which is substantially free of water, that is, contains less than about 5% and preferably less than about 1% water, based on the weight of the resin, and which is soluble in the solvents employed, such as phenolic resole or phenolic novolak resins formed by reacting phenolic compounds with aldehydes. Resole or A-stage resins, as well as resitol or B-stage resins, may be made by reacting a molar excess of aldehyde, such as formaldehyde, with a phenolic material in the presence of an alkaline catalyst or metal ion catalysts. The novolak resins may be formed by reacting a molar excess of phenolic component with an aldehyde in the presence of an acid catalyst.

The phenols employed in the formation of such phenolic resins are generally any of the phenols which may be utilized in the formation of phenolic resins. The only limitation is that the resin formed from the phenolic material is one that forms a homogeneous solution at room temperature with the solvent medium. Specific suitable phenols which may be used include phenol, o-cresol, m-cresol, p-cresol, 2,5-xylenol, 3,4-xylenol, 3,5-xylenol, 3,4,5-trimethylphenol, 2-ethylphenol, 3-ethylphenol, 3,5-diethylphenol, o-sec-butylphenol, p-butylphenol, 3,5-dibutylphenol, p-amylphenol, p-cyclohexylphenol, o-octylphenol, o-sec-decylphenol, nonylphenol, 3,5-dicyclohexylphenol, p-phenylphenol, p-crotylphenol, 2-methoxyphenol, 3,5-dimethoxyphenol, 3,4,5-trimethoxyphenol, p-ethoxyphenol, 3-methyl-4-methoxyphenol, and p-phenoxyphenol. One suitable phenolic component is a commercial mixture containing about 80% o-cresol and about 18% phenol. It is to be understood, however, that other suitable phenolic resin components can be used in the practice of this invention.

The aldehyde employed in formation of the phenolic resin component employed in this invention can also vary widely. In general, suitable aldehydes include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The isocyanate component which can be employed in a binder according to this invention, may likewise vary widely and has a functionality of 2 or more. Exemplary of the useful isocyanates are organic polyisocyanates such as tolylene-2,4-diisocyanate, tolylene-2,6-diisocyanate, and mixtures thereof, and particularly the crude mixtures thereof that are commercially available. Other typical polyisocyanates include methylene-bis-(4-phenyl isocyanate), n-hexyl diisocyanate, naphthalene-1,5-diisocyanate, cyclopentylene-1,3-diisocyanate, p-phenylene diisocyanate, tolylene-2,4,6-triisocyanate, and triphenylmethane-4,4',4''-triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyantes having the following general formula:

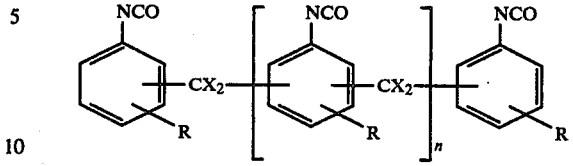

wherein R is selected from the group consisting of hydrogen, chlorine, bromine, alkyl groups having 1 to 5 carbon atoms, and alkoxy groups having 1 to 5 carbon atoms; X is selected from the group consisting of hydrogen, alkyl groups having 1 to 10 carbon atoms and phenyl; and n has an average value of at least about 1 and generally about 1 to about 3. A typical commercially available isocyanate is polymethylene polyphenylisocyanate such as PAPI-135 sold by Upjohn Co. and having a Brookfield viscosity of about 200 centipoises at 25° C., and an isocyanate equivalent of 134.

Generally, the amounts of the polyhydroxy component and the isocyanate component employed in a binder composition of the invention are not critical and can vary widely. However, there should at least be enough of the isocyanate component present to react substantially completely with the polyhydroxy component so that there is no significant unreacted excess of either component present when reaction is complete.

The isocyanate component is generally employed in a range of from about 15% to about 400% by weight, based on the weight of the polyhydroxy component, and is preferably employed in a range of from about 20 to about 200%. Moreover, while a liquid isocyanate can be used in undiluted form, so long as there is sufficient solvent employed with the polyhydroxy component, solid or viscous isocyanates can also be utilized and are generally used with an organic solvent. In this respect, the isocyanate component may include up to 80% by weight of solvent.

Furthermore, it is to be understood that in accordance with the invention, both the polyhydroxy and isocyanate components are, as a practical matter, preferably dissolved in solvents in order to provide component solvent mixtures of desirable viscosity and thus facilitate the use of the same, such as in coating aggregate material with the components. In this respect, sufficient solvents are employed to provide a Brookfield viscosity of solutions of the components which is below about 1,000 centipoises and preferably less than about 250 centipoises. More specifically, while the total amount of solvent can vary widely, it is generally present in a composition of this invention in a range of from about 5% to about 70% by weight, based on total weight of the polyhydroxy component, and is preferably present in a range of from about 20% to about 60% by weight.

The solvents employed in the practice of this invention are generally hydrocarbon solvents which preferably contain polar organic solvents such as organic esters.

Suitable exemplary hydrocarbon solvents include aromatic hydrocarbons such as benzene, toluene, xylene, ethyl benzene, high boiling aromatic hydrocarbon mixtures, heavy aromatic naphthas and the like. It is preferred to use hydrocarbon solvents with a flash point above 100° F.

As previously indicated, the compositions of this invention are particularly suitable for curing by the "cold box" process. When employing the "cold box" process, the catalyst employed is generally a volatile catalyst. Preferred exemplary catalysts are volatile tertiary amine gases which are passed through a core or mold generally along with an inert carrier, such as air or $CO_2$.

In this respect, it is to be noted that while gassing conditions may vary widely, they should be such that the amine catalyst contacts most of the binder in order to insure substantially complete reaction between the polyhydroxy component and the isocyanate component. Exemplary volatile tertiary amine catalysts, which result in a rapid cure at ambient temperature, that may be employed in the practice of the present invention include trimethylamine, triethylamine and dimethylethylamine and the like.

The binder compositions of this invention may be employed by admixing with a wide variety of aggregate materials, such as silica sand, lake sand, zircon, chromite, and the like; they are particularly useful in the foundry art as binding compositions for foundry sand. When so employed, the amount of binder composition can vary widely and is not critical. However, at least a binding amount of the binder composition should be present in order to coat substantially completely all of the sand particles. Preferably, the binder is present in the admixture in a range of from about 0.7% to about 4.0% by weight based on the total weight of the composition.

When the binder compositions of this invention are used in the "cold box" foundry process, the polyhydroxy component and isocyanate are first mixed with the aggregate material. The catalyst is added to the mixture as the last constituent of the composition so that premature reaction between the components does not take place. The polyhydroxy component and isocyanate component should not be brought in contact with each other until ready to use in order to prevent any premature reaction. These components may be mixed with the aggregate material either simultaneously or one after the other in any suitable mixing device.

It has been discovered that the addition of certain organic phosphorous compounds retards premature reaction of the binder components. This is particularly beneficial when the mixture of aggregate material and binder components have to be held for several hours before they are placed in the core box. The useful organic phosphorous compounds are selected from the groups: dichloroarylphosphines, chlorodiarylphosphines, arylphosphonic dichlorides and diarylphosphinyl chlorides. These have the general structural formulas: $ArPCl_2$, $Ar_2PCl$, $ArPOCl_2$ and $Ar_2POCl$ respectively, where Ar is an aromatic group such as phenyl, naphthyl, substituted phenyl, substituted naphthyl and the like. The nature of the substituent can vary widely. Specific suitable exemplary aryl groups include: o-tolyl, m-tolyl, p-tolyl, o-methoxyphenyl, m-methoxyphenyl and p-methoxyphenyl.

The organic phosphorous compound is conveniently mixed with the solution containing the isocyanate component at any time before this component is used in the binder system. Alternatively, the phosphorous compound, either neat or in solution, can be mixed with the aggregate material. This addition is made either before, at the same time or soon after the other binder components are added to the aggregate material.

Very small concentrations of the organic phosphorous compounds are effective in retarding the premature reaction of the binder components. Useful concentrations of the phosphorous compounds in the binder will vary somewhat with the nature and purity of the binder and aggregate components. Concentrations of from about 0.02% to about 3% by weight of the isocyanate compound can be used in the practice of this invention.

Other commonly employed additives can be optionally used in the binder compositions of this invention. Such additives include, for example, organo silanes which are known coupling agents. The use of such materials may enhance the adhesion of the binder to the aggregate material. Examples of useful coupling agents of this type include amino silanes, epoxy silanes, mercapto silanes, hydroxy silanes and ureido silanes such as, for example, gamma-aminopropyltrimethoxysilane, gamma-hydroxypropyltrimethoxysilane, 3-ureidopropyltriethoxysilane, gamma-mercaptopropyltrimethoxysilane, gamma-glycidoxypropyltrimethoxysilane, beta-(3,4-epoxycyclohexyl)trimethoxysilane, N-beta-(aminoethyl)-gamma-aminopropyltrimethoxysilane and the like.

In the practice of this invention, additives normally utilized in foundry manufacturing processes can also be added to the compositions during the sand coating procedure. Such additives include materials such as iron oxide, clay, potassium fluoroborates, wood flour and the like.

Use of the binders of this invention provides "cold box" systems having improved bench life when compared with the polyurethane binders previously used. While the polyurethane binders of this invention have been discussed in the context of "cold box" foundry systems, they can be used in other applications that require mixing the urethane components for an appreciable time before the catalyst is added to the mixture.

The following examples will serve to illustrate the practice of this invention. In the examples, all parts and percentages are by weight.

EXAMPLE 1

This example illustrates the use of various organic phosphorous compounds in polyurethane binder systems. The polyhydroxy component of the binder system used in the tests was Acme Flow 2030 Part 1 Resin, a phenolic resole resin solution available from the Acme Resin Corporation, Forest Park, Ill. The isocyanate solution was prepared by dissolving 75% polymethylene polyphenylisocyanate in 25% of an aromatic hydrocarbon solvent having a flash point above 100° F. To 100 parts of isocyanate solution was added 0.25 parts of each of the additives shown in Table I. The resole resin and isocyanate components were mixed with 20 KK lake sand using a Hobart A-120 mixer. The foundry mix was held for various time intervals before it was used to make 1-inch dog-bone tensile strength specimens. These were prepared by blowing the mix into a Redford CBT-1 core blower. Cores were blown at 50 psi air pressure and gassed 3 seconds with 12% dimethylethylamine in $CO_2$ at 30 psi and then for 5 seconds with purge air at 30 psi. Tensile strengths were measured 1 minute after curing using a Detroit Testing Machine Company Model CST Tensile Tester. Results of the test are given in Table I. Those mixes, which after being held for 4 to 6 hours before gassing give cores with higher tensile strength, have better bench life. Sand mixes containing the inhibitors, phenylphosphonic dichloride, dichlorophenylphosphine and chlorodiphenylphosphine, showed superior bench life to those of the control test cores made without any additive. They were also superior to the comparative example test cores which contained the carboxylic acid chloride, benzoyl chloride.

In a further evaluation of the sand-binder mixes, a 2-inch diameter by 2-inch high compression test specimen was prepared by ramming 170 g of each sand mix using a Dietert No. 315 sand rammer. The green compression strength was measured after 24 hours using either a Dietert No. 454C compression tester (up to 3 psi) or a No. 400 sand tester (up to 18 psi). The green compression strength of the specimens prepared with the binders of this invention, which employed the three organic phosphorous compounds, showed 24-hour green compression strength values of 7.9 to 10.3 psi. In contrast, the green compression strengths after 24 hours of the control and of the binder using benzoyl chloride were greater than 18 psi. These results indicate that the additives of this invention greatly reduce the tendency of the foundry mixes containing polyhydroxy compounds and polyisocyanates to harden before a catalyst is added.

TABLE I

| Time Components Held Between Mixing and Gassing (hrs) | \multicolumn{5}{c}{Tensile Strengths[a] (psi)} | | | | |
|---|---|---|---|---|---|
| | 0 | 2 | 4 | 6 | 24 |
| Additive[b] | | | | | |
| Phenylphosphonic Dichloride | 137 | 132 | 110 | 83 | [c] |
| Dichlorophenylphosphine | 150 | 123 | 112 | 88 | [c] |
| Chlorodiphenylphosphine | 128 | 128 | 85 | 80 | [c] |
| Benzoyl Chloride | 137 | 108 | 58 | [c] | [c] |
| None | 143 | 108 | 42 | [c] | [c] |

[a] A mix of 100 parts sand, 0.9 parts phenolic resin solution and 0.9 parts isocyanate solution was blown into a core box. Tensile strengths were measured one minute after the cores were removed from the box.
[b] Additive was 0.25% by weight of the isocyanate solution.
[c] A core could not be blown.

EXAMPLE 2

The procedure of Example 1 was followed except that in each case the additive represented 1% by weight of the solution of isocyanate component. The results given in Table II again show that the organic phosphorous compounds of this disclosure are effective inhibitors of the premature reaction of polyhydroxy and isocyanate components used in moldable compositions.

When the 24-hour green compression strength tests were performed on the sand mixes of this example, the mixes containing the organic phosphorous compounds showed green compression strength values of 2.3 to 3.3 psi, while the test specimens prepared using no inhibitor or using benzoyl chloride as the additive showed green compression strength values of greater than 18 psi. This again illustrates the ability of the organic phosphorous compounds to prevent premature hardening of the mixes.

TABLE II

| Time Components Held Between Mixing and Gassing (hrs) | Tensile Strengths[a] (psi) | | | | |
|---|---|---|---|---|---|
| | 0 | 2 | 4 | 6 | 24 |
| Additive[b] | | | | | |
| Phenylphosphonic Dichloride | 133 | 123 | 123 | 122 | 12 |
| Dichlorophenylphosphine | 123 | 127 | 117 | 110 | 5 |
| Chlorodiphenylphosphine | 138 | 125 | 103 | 98 | 8 |
| Benzoyl Chloride | 132 | 118 | 70 | 37 | [c] |

TABLE II-continued

| Time Components Held Between Mixing and Gassing (hrs) | Tensile Strengths[a] (psi) | | | | |
|---|---|---|---|---|---|
| | 0 | 2 | 4 | 6 | 24 |
| None | 143 | 108 | 42 | [c] | [c] |

[a] A mix of 100 parts sand, 0.9 parts phenolic resin solution and 0.9 parts isocyanate solution was blown into a core box. Tensile strengths were measured one minute after the cores were removed from the box.
[b] Additive was 1% by weight of the isocyanate solution.
[c] A core could not be blown.

What is claimed is:

1. In a binder composition comprising a polyhydroxy component, an isocyanate component having a functionality of two or more and sufficient catalyst to catalyze substantially completely the reaction between the polyhydroxy component and the isocyanate component wherein the improvement comprises including in the composition an additive selected from the group consisting of dichloroarylphosphines, chlorodiarylphosphines, arylphosphonic dichlorides, diarylphosphinyl chlorides, and mixtures thereof, said additive being present in an amount equal to from about 0.02% to about 3% by weight of the isocyanate component.

2. The binder composition according to claim 1 wherein the aryl group of the additive is selected from o-tolyl, m-tolyl, p-tolyl, o-methoxyphenyl, m-methoxyphenyl and p-methoxyphenyl.

3. A binder composition according to claim 1 wherein the polyhydroxy component is a phenolic resin.

4. A binder composition according to claim 3 wherein the phenolic resin is a phenolic resole resin.

5. A binder composition according to claim 3 wherein the phenolic resin is a novolak resin.

6. A binder composition according to claim 1 wherein the isocyanate component is polymethylene polyphenylisocyanate.

7. A binder composition according to claim 1 wherein the additive is dichlorophenylphosphine.

8. The binder composition according to claim 1 wherein the additive is chlorodiphenylphosphine.

9. The binder composition according to claim 1 wherein the additive is phenylphosphonic dichloride.

10. The binder composition according to claim 1 wherein the additive is diphenylphosphinyl chloride.

11. The binder composition according to claim 1 wherein the additive is dissolved in the isocyanate component.

12. A moldable composition comprising aggregate material, and a binder composition comprising a polyhydroxy component, an isocyanate component having a functionality of two or more and sufficient catalyst to catalyze substantially completely the reaction between the polyhydroxy component and the isocyanate component, wherein the improvement comprises including in the composition an additive selected from the group consisting of dichloroarylphosphines, chlorodiarylphosphines, arylphosphonic dichlorides, diarylphosphinyl chlorides, and mixtures thereof, said additive being present in an amount equal to from about 0.02% to about 3% by weight of the isocyanate component.

13. The moldable composition according to claim 12 wherein the aryl group of the additive is selected from o-tolyl, m-tolyl, p-tolyl, o-methoxyphenyl, m-methoxyphenyl and p-methoxyphenyl.

14. A moldable composition according to claim 12 wherein the polyhydroxy component is a phenolic resin.

15. A moldable composition according to claim 14 wherein the phenolic resin is a phenolic resole resin.

16. A moldable composition according to claim 14 wherein the phenolic resin is a novolak resin.

17. A moldable composition according to claim 12 wherein the isocyanate component is polymethylene polyphenylisocyanate.

18. A moldable composition according to claim 12 wherein the additive is dichlorophenylphosphine.

19. A moldable composition according to claim 12 wherein the additive is chlorodiphenylphosphine.

20. A moldable composition according to claim 12 wherein the additive is phenylphosphonic dichloride.

21. A moldable composition according to claim 12 wherein the additive is diphenylphosphinyl chloride.

22. A moldable composition according to claim 12 wherein the additive is dissolved in the isocyanate component.

23. A process for making foundry cores or molds comprising admixing aggregate material and a binding amount of a binder composition comprising a polyhydroxy component, an isocyanate component having a functionality of two or more, and an additive selected from the group consisting of dichloroarylphosphines, chlorodiarylphosphines, arylphosphonic dichlorides, diarylphosphinyl chlorides, and mixtures thereof, said additive being present in an amount equal to from about 0.02% to about 3% by weight of the isocyanate component; shaping the mixture of aggregate material and binder composition into a core or mold; and treating the core or mold with sufficient catalyst to bring about substantially complete reaction between the polyhydroxy component and the isocyanate component to give a cured core or mold.

24. The process according to claim 23 wherein the aryl group of the additive is selected from o-tolyl, m-tolyl, p-tolyl, o-methoxyphenyl, m-methoxyphenyl and p-methoxyphenyl.

25. A process according to claim 23 wherein the polyhydroxy component is a phenolic resin.

26. A process according to claim 25 wherein the phenolic resin is a phenolic resole resin.

27. A process according to claim 25 wherein the phenolic resin is a novolak resin.

28. A process according to claim 23 wherein the isocyanate component is polymethylene polyphenylisocyanate.

29. A process according to claim 23 wherein the additive is dichlorophenylphosphine.

30. A process according to claim 23 wherein the additive is chlorodiphenylphosphine.

31. A process according to claim 23 wherein the additive is phenylphosphonic dichloride.

32. The process according to claim 23 wherein the additive is diphenylphosphinyl chloride.

33. A process according to claim 23 wherein the additive is dissolved in the isocyanate component.

* * * * *